(12) United States Patent
Iida

(10) Patent No.: US 6,474,384 B1
(45) Date of Patent: Nov. 5, 2002

(54) HEAVY DUTY PNEUMATIC RADIAL TIRE WITH FOUR OR MORE BELT LAYERS

(75) Inventor: Hiroyuki Iida, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 129 days.

(21) Appl. No.: 09/644,828

(22) Filed: Aug. 24, 2000

(30) Foreign Application Priority Data

Aug. 27, 1999 (JP) ............................................ 11-241085
Aug. 21, 2000 (JP) ........................................ 2000-249648

(51) Int. Cl.$^7$ .............................. B60C 9/18; B60C 9/20; B60C 9/28
(52) U.S. Cl. ........................ 152/534; 152/535; 152/538
(58) Field of Search .................................. 152/534, 535, 152/538

(56) References Cited

U.S. PATENT DOCUMENTS 3,233,649 A    2/1966  Jolivet et al.
4,293,019 A   10/1981  Maiocchi
5,261,475 A  * 11/1993  Yoshino et al. ......... 152/534 X

FOREIGN PATENT DOCUMENTS

JP          05319014 A  * 12/1993  .................. 152/535
JP          11034608 A  *  2/1999  .................. 152/534

* cited by examiner

Primary Examiner—Adrienne C. Johnstone
(74) Attorney, Agent, or Firm—Sughrue Mion, PLLC

(57) ABSTRACT

A heavy duty pneumatic radial tire comprises a radial carcass, a belt and a tread, wherein the belt is comprised of four or more belt layers, cords of adjacent two belt layers among these layers are crossed with each other with respect to an equatorial plane of the tire. In this tire, when a main cross belt is constituted with a widest-width belt layer and a wider-width belt layer in two belt layers adjacent to the widest-width belt layer, an inclination angle of cords in a neighboring narrower-width belt layer arranged at an outside of the main cross belt in the radial direction and adjacent thereto with respect to an equatorial plane of the tire is made larger than an inclination angle of cords in a belt layer arranged outward in the radial direction among the widest-width and wider-width belt layers.

10 Claims, 1 Drawing Sheet

HEAVY DUTY PNEUMATIC RADIAL TIRE WITH FOUR OR MORE BELT LAYERS

BACKGROUND OF THE INVENTION

1. Field of the Invention

This invention relates to a heavy duty pneumatic radial tire having an excellent belt durability.

2. Description of Related Art

As the conventional heavy duty pneumatic radial tire, there is known, for example, a tire comprising a carcass toroidally extending between a pair of bead portions and containing cords embedded substantially in a radial direction, a belt disposed on an outside of the carcass in the radial direction and a tread disposed on an outside of the belt in the radial direction, wherein the belt is comprised of four or more belt layers, cords of adjacent two belt layers among these layers are crossed with each other with respect to an equatorial plane of the tire.

Since such a tire is run under heavy load, the belt is subjected to a large bending deformation in a circumferential direction so as to be made flat at a ground contact region. Moreover, the cords of the adjacent two belt layers are embedded in these layers so as to be inclined in opposite directions with respect to the equatorial plane, so that shearing strain is created between both the belt layers due to pantograph deformation of cords in these belt layers.

Such a shearing strain becomes larger as the width of the belt layer becomes wider and as it approaches to an end of the belt layer. That is, a largest shearing strain is created between an end of a widest-width belt layer and an end of a wider-width belt layer in two belt layers adjacent to the widest-width belt layer, i.e. between ends of main cross belt, whereby crack is first created between the ends of the widest-width belt layer and the wider-width belt layer and finally progressed into separation failure between the belt layers.

Moreover, it is said that in order to control such a separation failure between belt layers, it is effective to reduce the aforementioned shearing strain between the belt layers by making large the inclination cord angle of all belt layers inclusive of the main cross belt with respect to the equatorial plane of the tire.

However, it has been confirmed that it is impossible to sufficiently control the separation failure between belt layers even when the inclination cord angle is made large in all of the belt layers.

SUMMARY OF THE INVENTION

The inventor has examined and studied the separation failure between belt layers in the heavy duty pneumatic radial tire in detail and confirmed that in case of running the heavy duty pneumatic radial tire on rough road, bad road and the like scattered with rocks, ground stones and so on, when the belt is comprised of three or more belt layers inclusive of the main cross belt and a neighboring narrower-width belt layer is disposed on the outside of the belt in the radial direction and adjacent thereto, separation failure is created between end portions of the main cross belt and the neighboring narrower-width belt layer and largely affects the belt durability.

Now, the inventor has made various studies with respect to the mechanism of creating such a separation failure and found out that when the tire rides on projections such as rocks, ground stones and the like, the tread deforms so as to envelop the projection, during which the neighboring narrower-width belt layer near to the tread is mostly affected by the above deformation, while since the three or more belt layers (inclusive of the main cross belt) arranged at the inside of the neighboring narrower-width belt layer in the radial direction are high in the bending rigidity, the deformation concentrates only in the neighboring narrower-width belt layer arranged at the outside of the main cross belt in the radial direction and hence a large shearing strain is created between the main cross belt and the neighboring narrower-width belt layer to finally bring about the occurrence of separation failure between belt layers.

The invention is based on the above discovery and lies in a heavy duty pneumatic radial tire comprising a carcass toroidally extending between a pair of bead portions and containing cords embedded substantially in a radial direction, a belt disposed on an outside of the carcass in the radial direction and a tread disposed on an outside of the belt in the radial direction, wherein the belt is comprised of four or more belt layers, cords of adjacent two belt layers among these layers are crossed with each other with respect to an equatorial plane of the tire, and when a main cross belt is constituted with a widest-width belt layer and a wider-width belt layer in two belt layers adjacent to the widest-width belt layer, an inclination angle R of cords in a neighboring narrower-width belt layer arranged at an outside of the main cross belt in the radial direction and adjacent thereto with respect to an equatorial plane of the tire is made larger than an inclination angle H of cords in a belt layer arranged outward in the radial direction among the widest-width and wider-width belt layers.

When the inclination angle R is made larger than the inclination angle H as mentioned above, the change in the inclination angle of the cord of the neighboring narrower-width belt layer in the riding on the projection is decreased, whereby the shearing strain produced between the neighboring narrower-width belt layer and the main cross belt is decreased to effectively prevent the separation failure between belt layers.

Particularly, when the inclination angle R is made larger by 3–35° than the inclination angle H, the shearing strain is surely decreased to strongly control the occurrence of the separation failure between belt layers.

When the inclination angle R is within a range of 20–40° and the inclination angle H is within a range of 5–35°, the occurrence of the separation failure between belt layers can be more strongly controlled while ensuing the hoop effect.

Furthermore, it is favorable that a belt protection layer of cords having an elongation at break larger than that of the cord in the belt layer is disposed between the belt and the tread, whereby an external injury from the outer surface of the tread into the belt can be prevented.

And also, it is favorable that an inclination angle N of cords in an innermost belt layer arranged inward in the radial direction is made within a range of 5–15° with respect to the equatorial plane of the tire, whereby the growth of tire size and size growth during the running can effectively be decreased.

Further, it is favorable that a width M of the innermost belt layer is within a range of 0.33–0.70 times a maximum width of the main cross belt. In this case, the occurrence of separation failure from the end of the belt layer can be suppressed.

Moreover, it is favorable that a width Q of the widest-width belt layer is within a range of 0.60–0.85 times a tread width T. In this case, sufficient hoop effect can be developed while effectively suppressing the separation failure from the end of the belt layer.

BRIEF DESCRIPTION OF THE DRAWINGS

The invention will be described with reference to the accompanying drawings, wherein.

DESCRIPTION OF PREFERRED EMBODIMENTS

Figure 1:
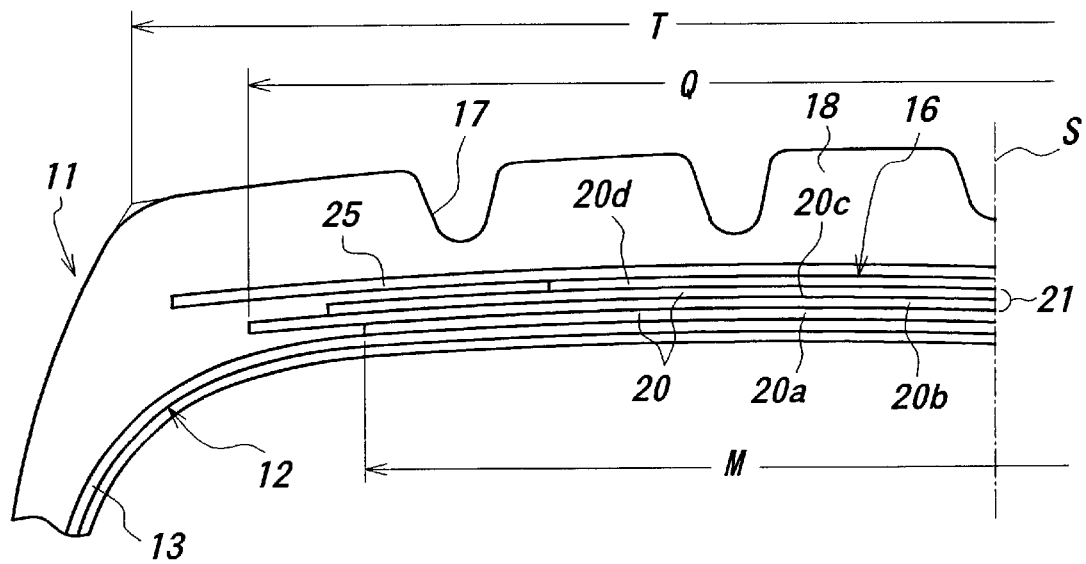
FIG. 1 is a diagrammatically section view of an embodiment of the heavy duty pneumatic radial tire according to the invention showing a neighborhood of a belt.

In FIG. 1, numeral 11 is a heavy duty pneumatic radial tire to be mounted onto a truck, bus, construction vehicle or the like. This tire 11 comprises a carcass 12 toroidally extending between a pair of bead cores (not shown), wherein each end portion of the carcass 12 is wound around the bead core from an inside of the tire toward an outside thereof in an axial direction of the tire. The carcass 12 is comprised of at least one rubberized carcass ply 13 containing inextensible cords such as steel cord or the like embedded therein and arranged substantially in a radial direction (inclined at an angle of 80–90° with respect to an equatorial plane S of the tire).

Numeral 16 is a belt arranged at an outside of the carcass 12 in the radial direction. On an outside of the belt 16 in the radial direction is arranged a tread 18 provided on its outer surface with wide grooves 17 such as main groove extending in a circumferential direction, lateral grooves extending substantially in a lateral direction and the like.

The belt 16 is constructed by laminating four or more belt layers 20 (four layers in the illustrated embodiment) one upon the other, each of which layers containing many inextensible cords such as steel cords or the like embedded therein in parallel to each other. And also, the cords in each of the belt layers 20 are inclined at an angle of 5–40° with respect to the equatorial plane S of the tire, and the cords of adjacent two belt layers 20 are inclined in opposite directions and crossed with each other with respect to the equatorial plane.

Among the belt layers 20, a widest-width belt layer 20b is arranged at a second position from an innermost side in the radial direction. And also, a wider-width belt layer 20c in two belt layers (20a, 20c) adjacent to the widest-width belt layer 20b is arranged at a third position from the innermost side in the radial direction in the illustrated embodiment. That is, the wider-width belt layer 20c is arranged on the outside of the widest-width belt layer 20b and adjacent thereto in the radial direction. A main cross belt 21 is constituted with the widest-width belt layer 20b and the wider-width belt layer 20c. As a result, circumferential tension is born by the hoop effect of the main cross belt 21 in the inflation under an internal pressure and in the running of the tire, whereby the growth of tire radius and size growth in the running of the tire 1 are controlled.

It is favorable that a maximum width of the main cross belt 21, i.e. width Q of the widest-width belt layer 20b is within a range of 0.60–0.85 times a tread width T. When the width Q is less than 0.60 times the tread width T, the hoop effect of the main cross belt 21 lowers and hence the growth of tire size and the size growth in the running of the tire can not sufficiently be controlled. While, when it exceeds 0.85 times the tread width T, shearing strain produced between ends of the widest-width belt layer 20b and the wider-width belt layer 20c becomes large to cause a fear of creating separation failure between belt layers.

Further, a neighboring narrower-width belt layer 20d adjacent to the main cross belt 21 is arranged between the main cross belt 21 and the tread 18 or on the outside of the main cross belt 21 in the radial direction. In other words, the neighboring narrower-width belt layer 20d is arranged at an outermost side in the radial direction among the belt layers 20. In the invention, an inclination angle R of cords in the neighboring narrower-width belt layer 20d with respect to the equatorial plane S of the tire is made larger than an inclination angle H of cords in a belt layer arranged outward in the radial direction among the widest-width and wider-width belt layers 20b, 20c or the wider-width belt layer 20c in the illustrated embodiment.

When the tire 11 is run on rough road, bad road and the like to ride on projections such as rocks, ground stones and so on, the tread 18 deforms so as to envelop the projection, during which the neighboring narrower-width belt layer 20d near to the tread 18 is mostly affected by the above deformation, while since the three belt layers 20a, 20b, 20c arranged inward from the neighboring narrower-width belt layer 20d in the radial direction are high in the bending rigidity, the deformation concentrates only in the neighboring narrower-width belt layer 20d. However, the inclination angle R of the cord in the neighboring narrower-width belt layer 20d with respect to the equatorial plane S of the tire is made larger than the inclination angle H of the cord in the wider-width belt layer 20c as mentioned above, so that even when the deformation concentrates only in the neighboring narrower-width belt layer 20d as mentioned above, the change in the inclination angle of the cords of the neighboring narrower-width belt layer 20d is controlled to a small value, whereby the shearing strain created between the neighboring narrower-width belt layer 20d and the main cross belt 21 is decreased to effectively suppress the separation failure between belt layers.

In the invention, it is favorable that the inclination angle R is larger by 3–35° than the inclination angle H. When the difference between the inclination angle R and the inclination angle H is less than 3°, the effect of decreasing the shearing strain is weak and the occurrence of separation failure between belt layers can not strongly be suppressed, while when the difference between the inclination angle R and the inclination angle H exceeds 35°, the hoop effect of the belt 16 lowers and the growth of tire size and size growth in the running of the tire can not sufficiently be controlled.

And also, it is favorable that the inclination angle R is within a range of 20–40°. When the inclination angle R is less than 20°, the shearing strain to the main cross belt 21 can not sufficiently be decreased, while when it exceeds 40°, the hoop effect of the belt 16 lowers and the growth of tire size and size growth in the running of the tire can not sufficiently be controlled. Furthermore, it is favorable that the inclination angle H is within a range of 5–35°. When the inclination angle H is less than 5°, the buckling of the belt layer is caused and it is difficult to manufacture the wider-width belt layer 20c, while when it exceeds 35°, the hoop effect of the belt 16 lowers and the growth of tire size and size growth in the running of the tire can not sufficiently be controlled.

Moreover, an innermost belt layer 20a adjacent to the main cross belt 21 is arranged between the main cross belt 21 and the carcass 12 or inward from the main cross belt 21 in the radial direction. That is, the innermost belt layer 20a is arranged at an innermost side of the belt in the radial direction. As a result, the innermost belt layer 20a is hardly subjected to local deformation through the projection as previously mentioned because it is far away from the tread 18. Therefore, it is favorable that an inclination angle N of the cord in the innermost belt layer 2a with respect to the equatorial plane S is made smaller than the inclination angle of the cord in the other belt layers 20b, 20c, 20d. In the invention, the inclination angle N is made not more than 15° to strongly develop the hoop effect. However, when the inclination angle N is less than 5°, the buckling as mentioned above is caused and it is difficult to manufacture the innermost belt layer 20a. Therefore, the inclination angle N is preferably within a range of 5–15°.

Furthermore, it is favorable that a width M of the innermost belt layer 20a is within a range of 0.33–0.70 times, preferably 0.40–0.55 times a maximum width of the main cross belt 21 or a width Q of the widest-width belt layer 20b. When the width M is less than 0.33 times the width Q, the hoop effect of the belt 16 lowers and the growth of tire size and size growth in the running of the tire can not sufficiently be controlled, while when the width M is more than 0.70 times the width Q, a large shearing strain is created between the widest-width belt layer 20b and the innermost belt layer 20a.

Numeral 25 is a protection belt layer disposed between the belt 16 and the tread 18. The protection belt layer 25 covers the belt 16 over its full width to suppress the occurrence of external injury in the belt 16 from the outer surface of the tire. In the inside of the protection belt layer 25 are embedded many high-extensible cords having an elongation at break larger than that of the cord in the belt layer, e.g. an elongation at break of 5–4%, wherein the cords are arranged in parallel to each other and inclined at a given angle with respect to the equatorial plane S of the tire.

Figure 2:
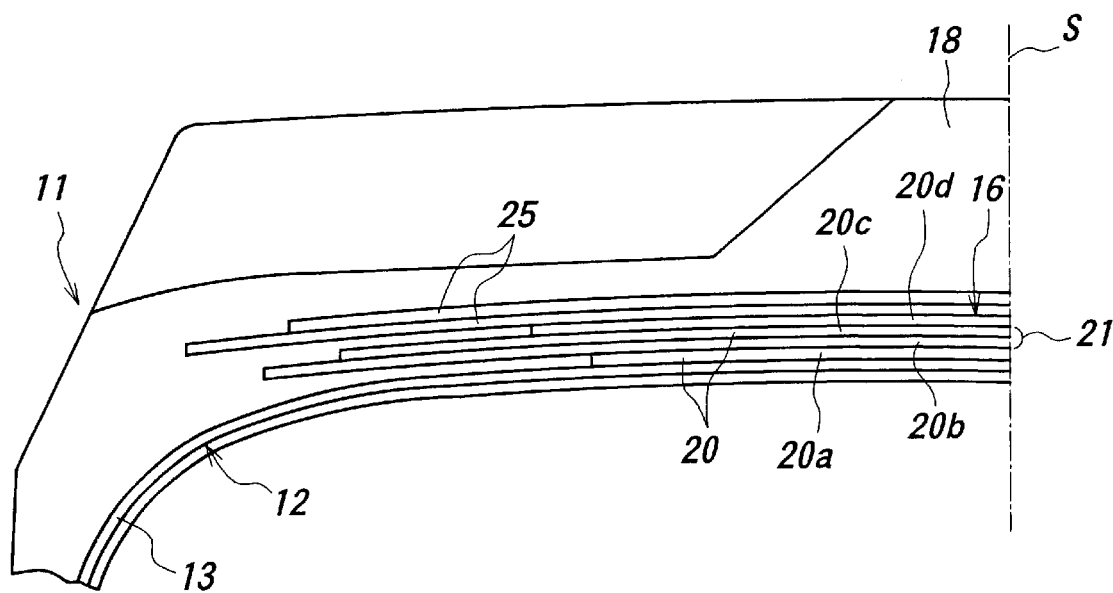
FIG. 2 is a diagrammatically section view of another embodiment of the heavy duty pneumatic radial tire according to the invention showing a neighborhood of a belt used in a test.

Although the belt 16 is comprised of four belt layers 20 in the illustrated embodiment, it may be comprised of five or more belt layers in the invention. And also, in case that the widths of the belt layers are shown in FIG. 2, the belt layers arranged at third and fourth positions from the innermost side in the radial direction may be counterchanged so as to make the width of the third belt layer narrower than that of the fourth belt layer.

The following examples are given in illustration of the invention and are not intended as limitations thereof.

FIRST TEST EXAMPLE

In this test, there are provided comparative tires 1–4 and example tires 1–4 having a tire size of 14.00R24, wherein a belt is comprised of an innermost belt layer arranged at an innermost side in the radial direction and having a width of 230 mm (shown by 1B in Table 1), a widest-width belt layer arranged at a second position from the innermost side in the radial direction and having a width of 280 mm (shown by 2B in Table 1), a wider-width belt layer arranged at a third position from the innermost side in the radial direction and having a width of 240 mm (shown by 3B in Table 1) and a neighboring narrower-width belt layer arranged at an outermost side in the radial direction and having a width of 150 mm (shown by 4B in Table 1) and a protection belt layer having a width of 310 mm is arranged between the belt and the tread. With respect to these tires, inclination cord angles of the belt layers are shown in Table 1, wherein symbol L means upwards to the left and symbol R means upwards to the right.

Then, each of the tires is mounted onto a standard rim (rim width: 10 inches) described in JATMA YEAR BOOK 1999 after a part of the tread is cut out so as to expose ends of adjacent belt layers 3B, 4B. Next, the tire is inflated under an internal pressure of 700 kPa and mass of 54.92 kN is applied thereto, and thereafter a deformation state at the ends of both belt layers is pictured by means of a camera, video-camera or the like, from which is detected strain between the ends of the belt layers. The results are also shown in Table 1 by an index on the basis that the comparative tire 1 is 100, wherein the index value of 100 corresponds to 48% strain.

TABLE 1

|  | Comparative tire | | | | Example tire | | | |
| --- | --- | --- | --- | --- | --- | --- | --- | --- |
|  | 1 | 2 | 3 | 4 | 1 | 2 | 4 | 4 |
| 4B | L15 | L15 | L15 | L10 | L25 | L20 | L18 | L17 |
| 3B | R15 | R18 | R21 | R21 | R15 | R15 | R15 | R15 |
| 2B | L23 | L23 | L23 | L23 | L23 | L23 | L23 | L23 |
| 1B | R21 | R21 | R21 | R21 | R21 | R21 | R21 | R21 |
| Strain between 3B and 4B | 100 | 98 | 96 | 114 | 75 | 81 | 86 | 96 |

SECOND TEST EXAMPLE

In this test, there are provided comparative tires 5–8 and example tires 5–9 having a tire size of 40.00R57, wherein a belt is comprised of an inner-most belt layer arranged at an innermost side in the radial direction and having a width of 390 mm (shown by 1B in Table 2), a widest-width belt layer arranged at a second position from the innermost side in the radial direction and having a width of 710 mm (shown by 2B in Table 2), a wider-width belt layer arranged at a third position from the innermost side in the radial direction and having a width of 610 mm (shown by 3B in Table 2) and a neighboring narrower-width belt layer arranged at an outermost side in the radial direction and having a width of 440 mm (shown by 4B in Table 2) and an inner protection belt layer having a width of 840 mm and an outer protection belt layer having a width of 660 mm are arranged between the belt and the tread as shown in FIG. 2. With respect to these tires, inclination cord angles of the belt layers are shown in Table 2.

Then, each of these tires is mounted onto a design rim (rim width: 29 inches) described on The Tire and Rim Association Inc. YEAR BOOK 1999 and inflated under an internal pressure of 700 kPa and run on a drum at 10 km/h under a load corresponding to mass of 1.0 MN (170% of 0.59 MN) to measure a running time until the occurrence of troubles in the belt. The results are also shown in Table 2 by an index on the basis that the comparative tire 5 is 100, wherein the index value of 100 corresponds to 220 hours. After the tire is run under the same conditions as mentioned above for 160 hours, it is cut out in the radial direction of the tire to measure crack length between the wider-width belt layer 3B and the neighboring narrower-width belt layer 4B and crack length between the widest-width belt layer 2B and the wider-width belt layer 3B. The results are also shown in Table 2 by an index on the basis that the comparative tire 5 is 100, wherein the index value of 100 corresponds to 50 mm.

TABLE 2

|  | Comparative tire | | | | Example tire | | | | |
| --- | --- | --- | --- | --- | --- | --- | --- | --- | --- |
|  | 5 | 6 | 7 | 8 | 5 | 6 | 7 | 8 | 9 |
| 4B | L15 | L18 | L15 | L18 | L25 | L23 | L21 | L20 | L19 |
| 3B | R18 | R18 | R25 | R25 | R18 | R18 | R18 | R18 | R18 |
| 2B | L21 | L21 | L21 | L21 | L21 | L21 | L21 | L21 | L21 |
| 1B | R5 | R5 | R5 | R5 | R5 | R5 | R5 | R5 | R5 |
| Running time | 100 | 106 | 102 | 108 | 137 | 130 | 119 | 112 | 108 |
| Crack width between 3B, 4B | 100 | 82 | 94 | 76 | none | none | none | 61 | 75 |
| Crack width between 2B, 3B | 85 | 81 | none | none | 82 | 81 | 81 | 79 | 80 |

THIRD TEST EXAMPLE

In this test, there are provided example tires 10–19 having a tire size of 40.00R57 in addition to the example tire 5, wherein a belt is comprised of an innermost belt layer arranged at an innermost side in the radial direction and having a width shown in Table 3 (shown by 1B in Table 3), a widest-width belt layer arranged at a second position from the innermost side in the radial direction and having a width of 710 mm (shown by 2B in Table 3), a wider-width belt layer arranged at a third position from the innermost side in the radial direction and having a width of 610 mm (shown by 3B in Table 3) and a neighboring narrower-width belt layer arranged at an outermost side in the radial direction and having a width of 440 mm (shown by 4B in Table 3) and an inner protection belt layer having a width of 840 mm and an outer protection belt layer having a width of 660 mm are arranged between the belt and the tread. With respect to these tires, inclination cord angles of the belt layers are shown in Table 3.

Then, each of these tires is run under the same conditions as in the second test example to measure a running time until the occurrence of troubles in the belt. The results are also shown in Table 3 by an index on the basis that the comparative tire 5 of the second test example is 100. After the tire is run under the same conditions as mentioned above for 160 hours, it is cut out in the radial direction of the tire to measure crack length between the wider-width belt layer 3B and the neighboring narrower-width belt layer 4B, crack length between the widest-width belt layer 2B and the wider-width belt layer 3B and crack length between the innermost belt layer 1B and the widest-width belt layer 2B. The results are also shown in Table 3 by an index on the basis that the comparative tire 5 of the second test example is 100. Furthermore, a quantity of size growth in tie radius of the tire is measured on an equatorial plane of the tire under no load after the tire is inflated under the above internal pressure. The results are shown in Table 3 by an index on the basis that the example tire 5 is 100, wherein the index value of 100 corresponds to 7.1 mm and the smaller the index value, the smaller the quantity of the size growth in the tire radius.

TABLE 3

|  | Example tire | | | | | | | | | | |
| --- | --- | --- | --- | --- | --- | --- | --- | --- | --- | --- | --- |
|  | 5 | 10 | 11 | 12 | 13 | 14 | 15 | 16 | 17 | 18 | 19 |
| 4B | L25 | L25 | L25 | L25 | L25 | L25 | L25 | L25 | L25 | L25 | L25 |
| 3B | R18 | R18 | R18 | R18 | R18 | R18 | R18 | R18 | R18 | R18 | R18 |
| 2B | L21 | L21 | L21 | L21 | L21 | L21 | L21 | L21 | L21 | L21 | L21 |
| 1B | R5 | R10 | R5 | R5 | R5 | R5 | R12 | R18 | R5 | R5 | R5 |
| Width of 1B | 390 | 390 | 430 | 470 | 340 | 520 | 390 | 390 | 290 | 240 | 220 |
| Running time | 137 | 126 | 152 | 122 | 146 | 91 | 113 | 107 | 129 | 110 | 94 |
| Crack width between 3B, 4B | none | none | none | none | none | none | none | none | none | none | none |
| Crack width between 2B, 3B | 82 | 85 | 81 | 73 | 91 | 68 | 98 | 105 | 98 | 109 | 120 |
| Crack width between 1B, 2B | none | none | 66 | 91 | none | 117 | none | none | none | none | none |
| Quantity of size growth | 100 | 108 | 98 | 96 | 106 | 93 | 110 | 113 | 111 | 121 | 138 |

As mentioned above, according to the invention, the belt durability can be improved by effectively suppressing the separation failure between belt layers.

What is claimed is:

1. In a heavy duty pneumatic radial tire comprising; a carcass toroidally extending between a pair of bead portions and containing cords embedded substantially in a radial direction, a belt disposed on an outside of the carcass in the radial direction and a tread disposed on an outside of the belt in the radial direction, wherein the belt is comprised of four or more belt layers, cords of adjacent two belt layers among these layers are crossed with each other with respect to an equatorial plane of the tire, and when a main cross belt is constituted with a widest-width belt layer and a wider-width belt layer in two belt layers adjacent to the widest-width belt layer an inclination angle R of cords in a neighboring narrower-width belt layer arranged at an outside of the main cross belt in the belt radial direction and adjacent thereto with respect to an equatorial plane of the tire is made larger than an inclination angle H of cords in a belt layer arranged outward in the radial direction among the widest-width and wider-width belt layers, and an inclination angle N of cords in an innermost belt layer arranged inward in the radial direction is made within a range of 5–15° with respect to the equatorial plane of the tire.

2. A heavy duty pneumatic radial tire according to claim 1, wherein the inclination angle R is made larger by 3–35° than the inclination angle H.

3. A heavy duty pneumatic radial tire according to claim 1, wherein the inclination angle R is within a range of 20–40° and the inclination angle H is within a range of 5–35°.

4. A heavy duty pneumatic radial tire according to claim 1, wherein a belt protection layer of cords having an elongation at break larger than that of the cord in the belt layer is disposed between the belt and the tread.

5. A heavy duty pneumatic radial tire according to claim 4, wherein said belt protection layer extends over the full width of said belt.

6. A heavy duty pneumatic radial tire according to claim 1, wherein a width M of the innermost belt layer is within a range of 0.33–0.70 times a maximum width of the main cross belt.

7. A heavy duty pneumatic radial tire according to claim 1, wherein a width Q of the widest-width belt layer is within a range of 0.60–0.85 times a tread width T.

8. A heavy duty pneumatic radial tire according to claim 1, wherein the cords of each of said belt layers are inclined in a range of 5–40° with respect to the equatorial plane of said tire.

9. A heavy duty pneumatic radial tire according to claim 1, wherein said widest-width belt layer is positioned as the second radially outward layer of said belt.

10. A heavy duty pneumatic radial tire according to claim 1, wherein said narrower-width belt layer is the radially outermost layer of said belt.

* * * * *